United States Patent [19]

Moore et al.

[11] Patent Number: 5,379,740

[45] Date of Patent: Jan. 10, 1995

[54] DUAL FUEL INJECTION SYSTEM AND A METHOD OF CONTROLLING SUCH A SYSTEM

[75] Inventors: Christopher P. Moore, Evandale; Manos Kavarnos, Hallett Cove, both of Australia

[73] Assignee: Biocom Pty, Ltd., Australia

[21] Appl. No.: 50,465

[22] PCT Filed: Nov. 20, 1991

[86] PCT No.: PCT/AU91/00531

§ 371 Date: Jul. 9, 1993

§ 102(e) Date: Jul. 9, 1993

[87] PCT Pub. No.: WO92/08888

PCT Pub. Date: May 29, 1992

[30] Foreign Application Priority Data

Nov. 20, 1990 [AU] Australia ............... PK 3408
Nov. 20, 1990 [AU] Australia ............... PK 3409

[51] Int. Cl.⁶ ........................................... F02M 51/00
[52] U.S. Cl. ..................................... 123/478; 123/301; 123/27 GE
[58] Field of Search ............... 123/478, 301, 27 GE, 123/525, 501, 575, 526, 1 A

[56] References Cited

U.S. PATENT DOCUMENTS

| | | |
|---|---|---|
| 4,381,750 | 5/1983 | Funada ............... 123/501 |
| 4,502,453 | 3/1985 | Kabasin et al. . |
| 4,513,727 | 4/1985 | Lagano et al. ............ 123/525 |
| 4,520,766 | 6/1985 | Akeroyd ............... 123/525 |
| 4,535,728 | 8/1985 | Batchelor ............... 123/525 |
| 4,596,211 | 6/1986 | Szloboda ............... 123/525 |
| 4,823,757 | 4/1989 | Redele ............... 123/501 |
| 5,092,305 | 3/1992 | King ............... 123/27 GE |
| 5,117,802 | 6/1992 | Durbin ............... 123/27 GE |
| 5,136,986 | 8/1992 | Jensen ............... 123/27 GE |
| 5,146,900 | 9/1992 | Sekiya ............... 123/301 |
| 5,228,423 | 7/1993 | Oikawa et al. ............ 123/525 |

*Primary Examiner*—Raymond A. Nelli
*Attorney, Agent, or Firm*—Wegner, Cantor, Mueller & Player

[57] ABSTRACT

A dual fuel injection arrangement for an internal combustion engine. Fuel is injected into the inlet manifold ducts to each engine cylinder via injectors. An arrangement of valves allows selected supply of either a first fuel or a second fuel to the injectors via inlet fuel rail and branch lines. Excess fuel is returned to each supply by way of return line (11). Electronic control units determine injection timing for the selected fuel dependent upon engine parameters for the first fuel and upon an adjusted timing for the second fuel where the adjustment takes account of the different characteristics of the second fuel compared with the first fuel. In particular there is disclosed an arrangement where the first fuel is gasoline and the second fuel is a liquified gas.

18 Claims, 2 Drawing Sheets

DUAL FUEL INJECTION SYSTEM AND A METHOD OF CONTROLLING SUCH A SYSTEM

This invention relates to fuel injection internal combustion engines and the operation of such an engine on two different fuels.

The invention will be generally discussed in relation to the operation of a petrol vehicle with liquefied petroleum gas as a second fuel but the invention is not restricted to these two fuels.

It is particularly desirable on the grounds of economics to have only one set of fuel injectors for the two fuels and this presents the problem that there must be some way of separating the two fuels and also to provide the ability to change injection timing to ensure that the correct amount of fuel enters the engine with the alternative fuels. If one investigates petrol and LPG it can be noted that on a gravimetric basis propane which is the predominant component in LPG contains 6% more energy than petrol whereas on a volumetric basis petrol contains 35% more energy than propane. For these reasons it is necessary to operate the two fuels in the dual fuel engine arrangement at different pressures and even so different injection timings are necessary. In such a system for instance petrol may be supplied to the engine at 250 kilopascals whereas LPG may be supplied to the engine in a pressure range of from 500–2000 kilopascals.

Another problem with fuel injection systems which this invention may solve is the problem of heating of the injectors with consequent vapourisation in the injector before injection.

The engine control computer in a petrol driven vehicle is arranged to provide the required amount of fuel to efficiently combine with the amount of air and in particular oxygen allowed into the engine by the throttle setting. The optimum amount of fuel varies with air and engine temperatures, running conditions demanded such as engine speed, acceleration, steady running for economy and the like. The typical computer system has inputs sensing engine speed, throttle position, air temperature, engine temperature, manifold or inlet air pressure, air-conditioning condition and whether at idle or over-run etc. All such inputs along with a feedback input from an oxygen sensor sensing the actual combustion conditions as detected in the exhaust system combine to allow the computer to optimise the quantity of fuel admitted to the engine.

For a petrol engine the petrol admission to each cylinder is controlled by an electric valve, an injection valve, which admits petrol under pressure to the inlet manifold of the engine for as long as the valve is opened. The actual time of opening may be adjusted to allow for opening or closing delays so that a selected amount of petrol is injected.

The existing vehicle computer therefore takes into account all of these variables to command the injectors to open for a time such as to allow the calculated amount of fuel for optimum combustion to reach the engine.

It is the object of this invention to provide a control system by which an optimum amount of a second fuel in a dual fuel internal combustion engine can be injected. In general the second fuel discussed in this invention will be LPG but a similar logic may be used for an alternative second fuel such as methanol.

This present invention provides an arrangement whereby such an engine can be controlled and supplies a control arrangement for such an engine.

In one form therefore the invention is said to reside in a dual fuel injection arrangement for an internal combustion engine comprising a single fuel rail supplying either a first or a second fuel to at least one injector for injecting fuel into an inlet manifold of the engine, a first control unit acting upon engine parameters and demand parameters for the first fuel to determine injector timing for the first fuel and a second control unit to convert injection timing for the first fuel into injector timing for the second fuel dependent upon the supply characteristics of the second fuel.

In an alternative form the invention may be said to reside in a method of providing an injection pulse time for a second fuel for an internal combustion engine connected for dual fuel operation comprising determining the maximum first fuel injection pulse time for a first fuel, determining the maximum second fuel injection pulse time for the second fuel, and determining a difference in the maximum times, starting the second fuel pulse a period at least equal to the difference after the start of the first fuel pulse start time, determining the length of the first fuel pulse time by noting when the first fuel pulse time ends and using the length of the first fuel pulse time and other variables to calculate an second fuel pulse time and stopping the second fuel pulse the calculated pulse time after starting the second fuel pulse.

In an alternative form the invention may be said to reside in a method of controlling the injection of fuel into an internal combustion engine being operated by either on injection of a first fuel or injection of a second fuel using the same injectors, the method comprising determining the injection timing characteristics for first fuel and converting the injection timing to be the correct timing for a second fuel dependent upon the energy characteristics of the second fuel and the pressure of the second fuel.

As discussed above in one preferred embodiment the first fuel may be petrol and the second fuel may be liquid petroleum gas (LPG) and the second fuel may be operated at a higher pressure than the first fuel. Another second fuel may be methanol.

The supply characteristics upon which the conversion of engine timing from first fuel to the second may be done may be the pressure of the second fuel and the actual composition of the second fuel. In the case where the second fuel is LPG where the composition may range from 40% propane and 60% butane for Australia but can vary to any mix of butane and propane worldwide up to 100% propane and at 30 degrees Celsius for instance this may mean a range of vapour pressure from 100 kilopascals up to nearly 2000 kilopascals. It is desirable that a LPG injection arrangement operate entirely in the liquid phase hence it is necessary to maintain the pressure of the LPG above the vapour pressure at a given temperature and as vapour pressure may rise to 1600 kilopascals at 45° C. then the engine must be operated at considerably above that pressure to ensure maintenance of LPG in the liquid state.

This invention preferably provides that the injectors are of a flow-through type so that a considerable excess to the amount of fuel necessary for supplying to the engines flows through the injectors and absorbs heat and takes it away to the respective fuel tanks depending upon which fuel is being used. This will assist in prevention of vapourization of the fuel in the injector.

In one particular example for instance the ratio of circulating to used flow may range from 100:1 for idling using petrol to 3:1 using petrol at full power and for LPG there may be 230:1 circulating to used flow at idle and 7:1 circulating to used flow at full power. The actual flow rate of LPG in the system may be 270 liters per hour of liquid LPG.

The flow-through fuel injector may have an inlet near its bottom so that fuel flowing into the injector is immediately available for injection into the inlet manifold if required and internal passages can be provided in the injector to withdraw the LPG or petrol from the top of the injector to return the excess fuel to the fuel tank with heat either generated in the valve by the electric solenoid arrangement or from conduction and radiation from the engine. Such an injector may be known as a bottom feed injector.

A fuel rail for such a system therefore actually comprises an inlet rail which is directed towards each injector and an outlet rail extending from each injector. There may be first fuel and second fuel inlets into the inlet rail and first fuel and second fuel outlets from the outlet rail. In one particular embodiment there may be provided solenoid valves on the inlet for the more highly pressurised fuel and the outlet of the less pressurised fuel and non-return valves preventing flow out of the fuel rail from in the first fuel inlet and preventing flow into the outlet rail from the second fuel outlet.

A non-return valve in the LPG inlet line and a solenoid valve in the LPG outlet line may be used to prevent first fuel flow into the second fuel tank if the second fuel is at a lower pressure than the first fuel.

The fuel rails and injector lines may be insulated to prevent heat gain to ensure that so far as possible in all operating conditions vapourisation does not occur in any of the fuel lines or rails. Alternatively the fuel rails may be of a low heat capacity construction so they can be easily cooled by the circulating flow of fuel.

The device according to this invention may be provided in a motor vehicle during manufacture or alternatively may be installed as a retro-fit item after manufacture. In such a case the second electronic control unit which takes signals from the existing first electronic control unit in the vehicle may be connected into the electrical signal lines from the first electronic control unit to the injectors to vary the injection characteristics when the device is being operated in the alternative fuel mode.

To ensure that at all times LPG is supplied to the injector arrangement in liquid form it is desirable to have the LPG fuel pump immersed or partially immersed at least on the suction side in the LPG liquid. In one preferred embodiment the housing of the pump may be designed to have the suction side of the pump immersed in liquid as a secondary tank. The differential LPG pressure relief regulator may be set so the fuel pump may operate at its maximum efficiency which provides a typical discharge pressure of 200–300 kilopascals over the vapour pressure of the liquid at a flow rate of about 250 liters per hour.

The LPG fuel circulates through a fuel filter, a solenoid valve and temperature and pressure sensors to the inlet fuel rail and on to the injectors. The LPG return may go via a non-return valve and a differential pressure relief regulator to return to the LPG tank. The non-return valve may incorporate the differential pressure relief regulator by inclusion of a spring in the non-return valve of the desired cracking pressure. The circulation flow rate may be always substantially constant but the operating LPG pressure varies depending upon the vapour pressure of the LPG in the fuel tank. Injection timing may be controlled by the LPG electronic control unit or the second electronic control unit which is connected to the activation signal provided for the petrol injector to compensate for the LPG energy requirements for instance for pressure, density and combustion variations. The pulse width signal for the injectors is derived using look up tables or maps stored in the LPG control unit due to determine the correct pulse read signal from the petrol control unit output. Alternatively the pulse width of the injector signal for LPG operation may be calculated using the petrol pulse width and a calculation based upon variables such as the LPG pressure and temperature.

Preferably the invention is characterised by determining the maximum difference between the injection times for the two different fuels and starting the injection pulse for the second fuel after the commencement of the petrol pulse by at least the maximum difference in times and then noting when the petrol pulse injection time ends and using the length of the petrol pulse to calculate a second fuel pulse time and then closing off the second fuel pulse the calculated time after starting the second fuel pulse.

It will be seen that by this invention a further computer on the motor vehicle is used to measure the opening demand pulse from the vehicles computer and to translate this in to a different demand pulse to allow an amount of alternative fuel such as LPG corresponding in an energy level to that of the petrol demand to pass to the engine. The energy level of LPG versus that in petrol is taken into consideration along with other variables such as the pressure of the second fuel such as LPG which of course will determine the flow rate through the injector and the injector opening and closing times under the different LPG pressure. The original inputs to the vehicles petrol time pulse computer remain effective and the add on computer may be inside of the controlled feedback loop closed by the exhaust oxygen sensor such that the oxygen sensor remains in control of the combustion conditions when allowed by the vehicle computer. It will be noted that it is necessary to delay the start of the alternative fuel injector timing pulse by a period after the start of the petrol injection pulse from the vehicle computer as the typical second fuel injector time requirement is less than the petrol requirement. If it were started coincident with the petrol pulse then the LPG pulse or second fuel pulse would need to end before the petrol pulse which is of unknown duration until it has actually been completed. This present invention therefore proposes a delay in the start in the alternative fuel pulse by a time slightly longer than the maximum determined difference between the corresponding pulse length petrol versus LPG so ensuring that the alternative fuel pulse end as controlled by the added on computer will always correctly take place after the petrol pulse end.

It may be noted that in the case of the second fuel being LPG then at very low temperatures, for example $-20°$ to $-40°$ C. or at $5°$ C. to $-40°$ C. for LPG with butane at more than 60% by volume when LPG will have a very low vapour pressure then the LPG pulse width may always be longer than the equivalent petrol pulse width which implies that the LPG pulse can start coincident with the petrol pulse and the LPG pulse can finish after the petrol pulse ends. The actual timing for the LPG pulse can be calculated by using the pulse width of the previous petrol pulse.

The injection timing strategy for LPG or second fuel injection in a dual fuel engine may be explained as follows. A delay is set up during programming of the motor vehicle add-on computer such that it is slightly greater than the maximum difference between the petrol and LPG pulses. The maximum difference normally occurs at the maximum petrol pulse width. Because of the higher pressures used when operating on LPG the LPG time is normally shorter than the petrol time so that the LPG time still fits into the maximum time available in which any injection pulse must occur. The term normally may be generally be taken to mean that the system is operated at ambient temperatures above about −5° C. and the butane content of the LPG is not more than 50% by volume.

An electronic control module is designed to ensure that the required end of the LPG pulse always occurs after the end of the petrol pulse for any possible petrol pulse width. The delay is typically in the order of 5 milliseconds. The actual value of the delay may be from 3 to 8 milliseconds depending upon the operating pressure of the second fuel or LPG. For short input pulse width which are less than the delay the computer can be programmed to start the LPG pulse at the end of the input pulse. In general the LPG pulse time is typically in the order of 70% of the time for the petrol pulse but this again depends upon the operating pressure and composition characteristics of the second fuel or LPG.

Should the requirement for a longer output pulse than the maximum petrol pulse time minus the delay occur an alternative arrangement can be used at high engine speed (above about 2000 revolutions per minute). The pulses for petrol and gas can be made to start at the same time provided the length of the LPG pulse has been determined from the value of the previous petrol pulse and this pre-determined pulse time used to end the LPG pulse before the petrol pulse ends. This alternative of actually determining the length of the LPG output pulse from the previous petrol pulse and synchronising the start of this pulse with the start of the next petrol pulse is not useful at low engine speeds because too much time occurs between successive pulses causing a flat spot type miss in the engine during acceleration.

To enable calculation of the LPG pulse from the given petrol pulse a computer may use look up tables or maps upon which a pulse length can be determined depending upon the various inputs, As discussed above the inputs for LPG may be the petrol pulse length and, the pressure of the LPG, which of course will give a measure of the amount of fuel that will enter in the given time, and the like.

As an aternative the determination of the LPG or alternative fuel pulse width may be calculated by the use of a formula which uses the various variables as discussed above to calculate the equivalent LPG required.

The operating pressure of LPG in a typical system may vary from 400 to 2200 kilopascals depending on ambient temperature. Therefore, a number of lookup tables or maps corresponding to the various pressures may be used to calculate the LPG injection timing. It is found the the LPG pulse will vary depending upon operating pressure but its equivalent petrol pulse is about 30 to 40% longer. It has been found that the relationship is not linear due to the opening and closing times of the injector at short and long pulse widths as well as the higher operating pressures of LPG in comparison to petrol. During idling a petrol pulse width is about 4 milliseconds whereas an LPG pulse width is in the order of 2.0 to 2.5 milliseconds depending on the operating pressures. At full power maximum pulse width of petrol pulse is about 27 milliseconds for some vehicles going down to 18 milliseconds for others at normal engine temperatures whereas an LPG pulse width is in the order of 11 to 14 milliseconds depending on the vehicle and the operating pressures.

This then generally describes the invention but the invention will now be discussed in relation to a preferred embodiment as shown in the accompanying drawings in which:

FIG. 1 shows an LPG/petrol dual fuel injection system installed onto an internal combustion engine for a motor vehicle but it will be realised that the invention also relates to a change over or add on kit which may be provided to connect into a motor vehicle. The system may also be used on a engine in other than a motor vehicle.

Figure 1:
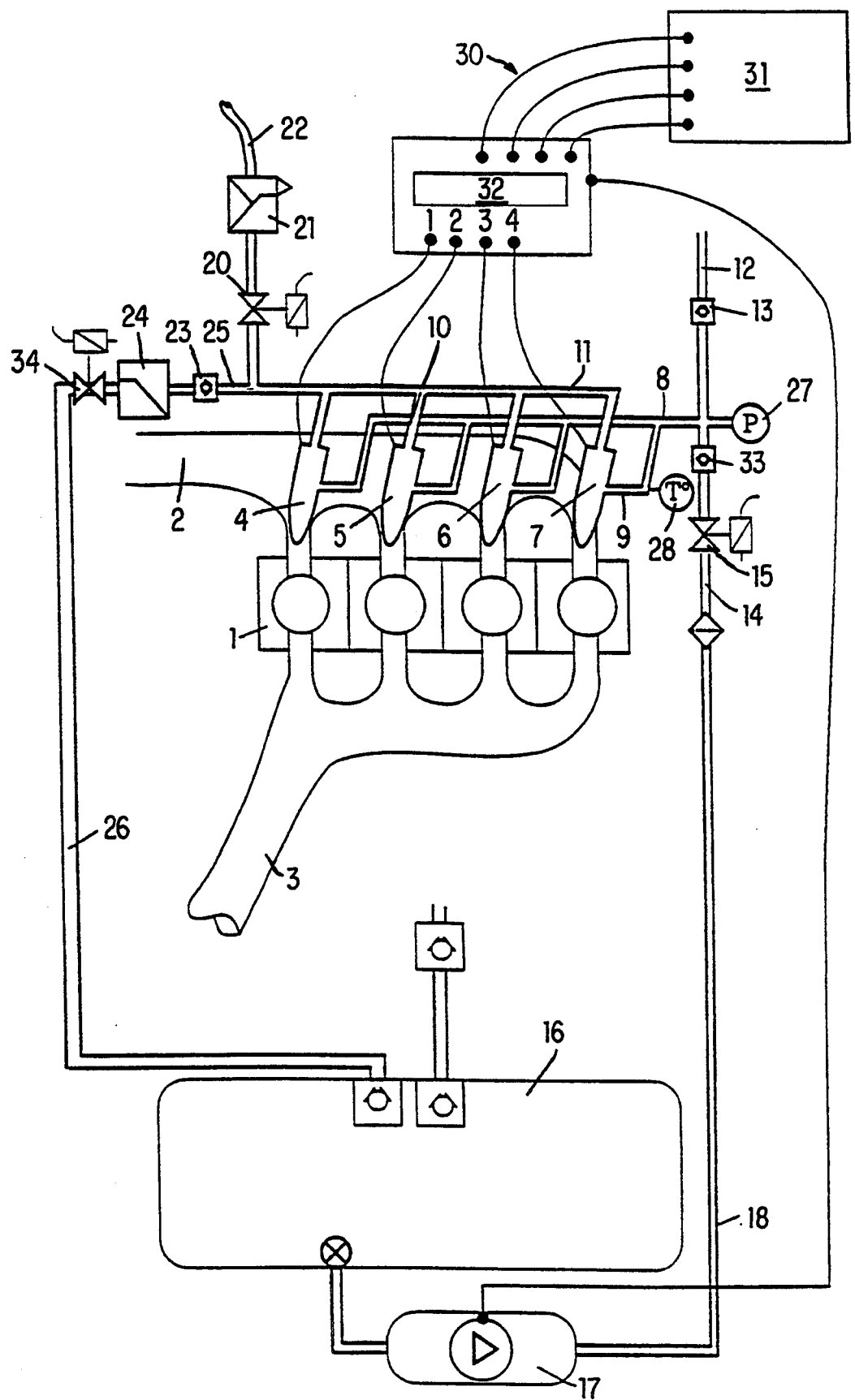
FIG. 1 shows a stylized dual fuel injection system for an internal combustion system.

The drawing generally shows an arrangement of an engine having fuel injectors with the LPG injection system shown in stylised detail and only the petrol inlet and outlets shown.

A four cylinder engine 1 has an air inlet manifold 2 and an exhaust manifold 3. Fuel injectors 4, 5, 6 and 7 are provided to inject fuel into the inlet manifold ducts to each cylinder of the engine. A fuel rail system comprises an inlet fuel rail 8 provided with branch lines 9 which extend into the bottom of the respective fuel injectors 4, 5, 6 and 7. Branch lines 10 remove fuel from the top of the injectors 4, 5, 6 and 7 into a outlet fuel rail 11. A petrol inlet line 12 with a non-return valve 13 allows petrol into the inlet fuel rail 8. A LPG inlet line 14 allows LPG to enter the inlet fuel rail 8 through a solenoid valve 15. An LPG tank 16 and LPG fuel pump 17 direct fuel by means of LPG fuel line 18 to the LPG inlet 14. A non-return valve 33 in the LPG inlet line 14 prevents flow of petrol into the LPG tank when the LPG pressure is lower than the petrol pressure.

A solenoid valve 20 and pressure regulator 21 and are provided in the petrol outlet line 22 which is connected to the outlet fuel rail 11.

A non-return valve 23, solenoid valve 34 and LPG pressure regulator 24 are provided in an LPG outlet line 25 which extends also from the outlet fuel rail 11. A LPG return line 26 is provided to return fuel to the LPG tank. The non-return valve 23 and the pressure regulator 24 may be incorporated into a single device with a cracking pressure or differential pressure set at the desired pressure above the LPG vapour pressure.

A pressure sensor 27 detects fuel pressure in the fuel inlet rail and a temperature sensor 28 detects temperature of inlet fuel particularly for the LPG.

The LPG pressure regulator 24 is provided to regulate the LPG pressure at a pressure of 200–300 kilopascals above the vapour pressure of the LPG in the LPG tank.

The engine according to this invention includes an electronic control arrangement to control the injection of fuel into the engine.

In this embodiment the electronic control arrangement is divided into two separate components with a first component being the electronic control unit 31 for petrol injection and a second electronic control unit 32 being provided to convert the petrol injection timing pulses in lines 30 to LPG injection timing pulses when the vehicle is switched to LPG operation. In situations where the system is being operated on petrol the injection signals are generated in the electronic control unit 31 and are routed through the second electronic control unit 32 without being changed.

The four wires 30 which extend from the petrol injection control unit are connected into the LPG control unit 32 and after taking into account the pressure of the LPG the temperature and other factors an LPG timing pulse for LPG is calculated or determined from look-up tables and the signal for each injector is directed to the respective electric solenoid injector valves 4, 5, 6 and 7.

It is to be understood that in some motor vehicles only one fuel injector is used for both petrol and LPG with injection occurring in the inlet manifold before the inlet manifold branches to the various cylinders. The injection arrangement of the present invention is also possible with such an arrangement.

The method of operation of the engine according to this invention is as follows.

When the engine is being operated on petrol then the solenoid valve 15 in the LPG inlet line and solenoid valve 34 in the LPG outlet line are closed and the solenoid valve 20 in the petrol outward line 22 is open and petrol flows in a continuous flow through the inlet fuel rail to each of the injectors to cool the injectors and is used as set by the injection timing by the injectors. The engine control unit 31 provides a petrol pulse signal and the LPG control unit 32 does not convert the signals and directs them directly to each injector. Excess fuel is returned through outlet fuel rail 11 to petrol return line 22.

It should be noted that should the injectors be changed or altered in flow characteristics during the conversion process the LPG control can be utilized to correct for such altered characteristics when operating on petrol.

When it is desired to change over to LPG operation the petrol solenoid valve 20 is closed and the LPG solenoid valves 15 and 34 is opened and the fuel pump 17 is activated. This provides LPG at a fixed differential pressure determined by pressure regulator 24 and the vapour pressure at the particular time to the fuel rails and once again a circulating flow is achieved with considerable excess flow to ensure cooling of the injectors. The non-return valve 13 in the petrol inlet line is set up so that LPG cannot enter the petrol inlet line and the non-return valve 23 in the LPG outlet line allows LPG to pass back to the LPG tank. The petrol pulse signals calculated in the electronic control unit 31 and transmitted through lines 30 are converted in the LPG control unit depending upon the pressure determined by pressure sensor 27 so that a correct calorific amount of LPG can be injected.

Figure 2:
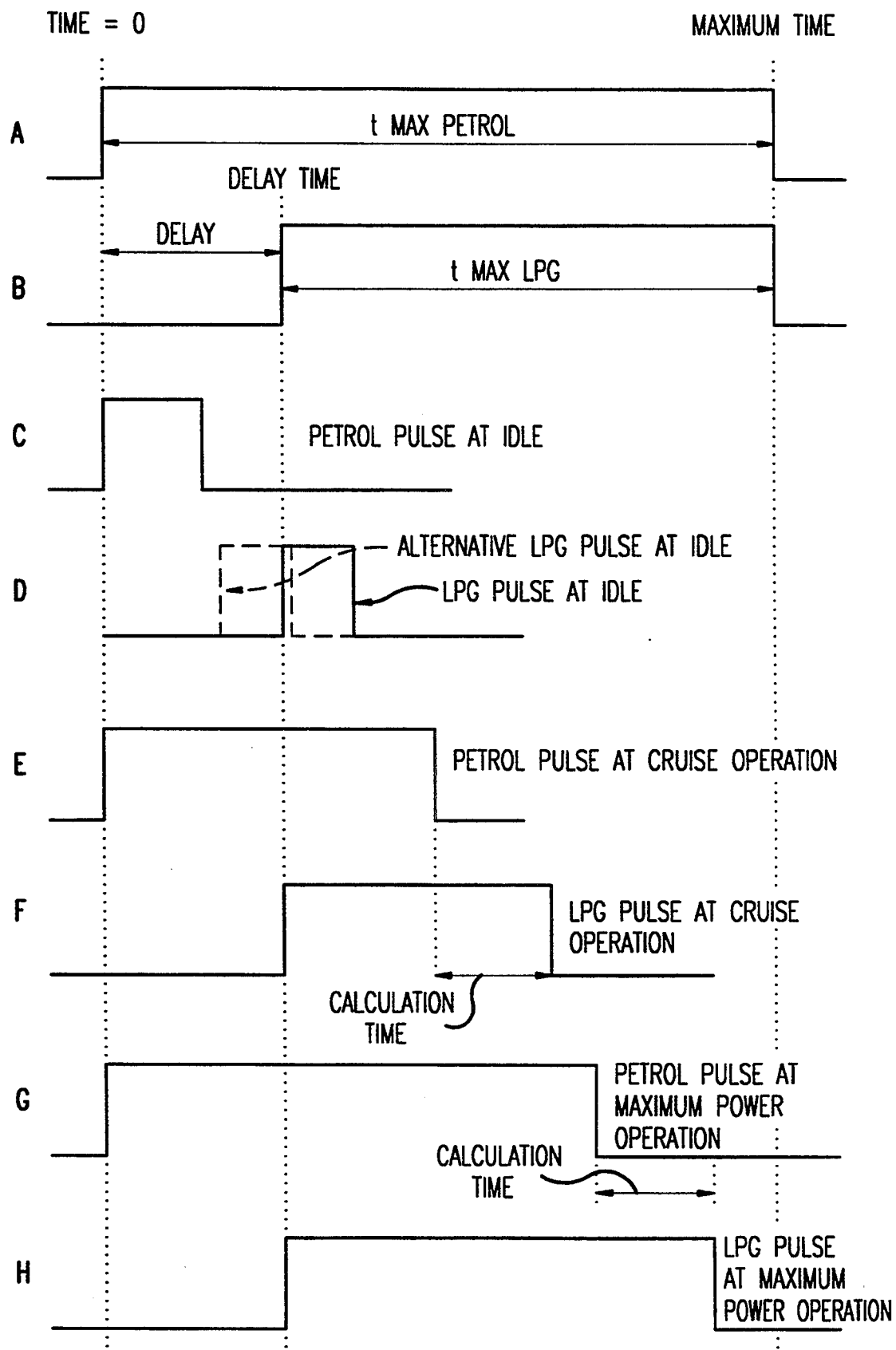
FIG. 2 shows various timing pulses for dual fuel injection.

The timing arrangement is illustrated in FIG. 2 of the accompanying drawing which shows various pulse arrangements for fuel injection. Graph A shows a maximum petrol pulse (t max petrol) which may be in the order of 22 milliseconds and Graph B shows a maximum LPG pulse (t max petrol) which as discussed above may be 11 to 14 milliseconds depending upon the type of vehicle and the actual fuel pressure. The difference in time between A and B is indicated as the difference or delay and can be determined during programming. This delay is normally then set into the programme for a control system.

It can be seen in Graph C that a petrol pulse at engine idle of perhaps 3 or 4 milliseconds commences at time 0 and actually stops before the end of the delay time. The LPG pulse is not started until the delay time has ended by which time the petrol pulse has been completed and the actual LPG pulse at idle can be calculated and completed. Alternatively the LPG pulse can be started immediately after the completion of the petrol pulse in this particular case where the petrol pulse finishes before the completion of the delay time. In the same way the length of the LPG pulse can be calculted from the petrol pulse. This is shown graphically by the dotted pulse line in Graph D.

In this case the LPG pulse is perhaps 2 to 2.5 milliseconds as shown in Graph D.

Graph E shows a petrol pulse at engine cruise operation when the pulse is of a length of perhaps 10 milliseconds. In this case the corresponding LPG pulse as shown in Graph F commences at the end of the delay time which is before the end of the petrol pulse but continues longer than the petrol pulse so that when the petrol pulse ends there is sufficient time to calculate the correct ending time for the LPG pulse and to stop the LPG pulse at the required time.

As shown in Graphs G and H at maximum engine power operation a similar arrangement occurs with the LPG pulse starting the delay time after the commencement of the petrol pulse but sufficient time is available to calculate the end of the LPG pulse after the end of the petrol pulse.

It will be noted that the pulses in all cases end within the maximum petrol time and by starting the LPG pulses the delay time after the commencement of the petrol pulses it ensures that the LPG pulses always end after the corresponding petrol pulse so that the time may be calculated.

It will be seen that by this invention there is provided a method and arrangement by which an existing petrol engine can be converted to dual fuel operation, for instance for petrol and LPG operation with a minimum of new components necessary and also an arrangement in which a second fuel injection system such as an injection system utilizing LPG can be installed in a motor vehicle as a dual fuel vehicle when initially sold.

We claim:

1. A dual fuel injection arrangement for use in an internal combustion engine comprising (a) at least one injector for injecting fuel into an inlet manifold of the engine, (b) a single fuel rail system capable of supplying one of a first fuel and a second fuel to the at least one injector, (c) a first control unit using engine parameters and demand parameters for the first fuel to determine injector timing for the first fuel, and (d) a second control unit using supply characteristics of the second fuel to convert injection timing for the first fuel from the first control unit into injector timing for the second fuel.

2. A dual fuel injection arrangement as in claim 1 wherein the supply characteristics are composition and pressure of the second fuel.

3. A dual fuel injection arrangement as in claim 1 wherein the first fuel is petrol and the second fuel is LPG supplied at a higher pressure than the first fuel.

4. A dual fuel injection arrangement as in claim 1 wherein the single fuel rail system comprises an inlet rail directed towards the at least one injector, an outlet rail extending from the at least one injector, and the at least one injector is a flow-through injector.

5. A dual fuel injection arrangement as in claim 1 wherein the at least one injector is a bottom feed injector.

6. A dual fuel injection arrangement as in claim 4 wherein the inlet rail has a first fuel inlet and a second fuel inlet, the outlet rail has a first fuel outlet and a second fuel outlet, a solenoid valve is present on each of the second fuel inlet and the first fuel outlet, a non-return valve is present on each of the first fuel inlet and the second fuel outlet, and the second fuel is supplied at a higher pressure than the first fuel.

7. A dual fuel injection arrangement as in claim 1 wherein the single fuel rail system has a sufficiently low heat-capacity construction so as to permit cooling by circulating flow of each of the first fuel and the second fuel.

8. A dual fuel injection arrangement as in claim 6 further comprising a fuel system for the second fuel having a tank for holding the second fuel, a fuel pump for raising the pressure of the second fuel to a fixed differential above vapor pressure of the second fuel when in the tank, a fuel line from the pump to the second fuel inlet, a return fuel line from the second fuel outlet to the tank, and a fuel regulator in the return fuel line.

9. A dual fuel injection arrangement as in claim 8 wherein the fuel regulator is incorporated in the non-return valve in the second fuel outlet.

10. A method for controlling fuel injection in an internal combustion engine operating on one of a first fuel and a second fuel injected through at least one injector comprising steps of (a) determining injection timing for the first fuel and (b) converting the injection timing for the first fuel into injection timing for the second fuel using a composition and pressure of the second fuel.

11. A method as in claim 10 further comprising steps of (c) determining a maximum difference between the injection timing for the first fuel and injection timing for the second fuel, commencing an injection pulse for the first fuel, and, after at least the maximum difference between the injection timing for the first fuel and the injection timing for the second fuel, starting an injection pulse for the second fuel.

12. A method as in claim 11 further comprising steps of (e) determining duration of the injection pulse for the first fuel, (f) calculating a duration of the injection pulse for the second fuel using the duration of the injection pulse for the first fuel, and then (g) conducting the injection pulse for the second fuel for the duration calculated.

13. A method as in claim 10 wherein determining injection timing for the first fuel is performed by a microprocessor utilizing a look-up table.

14. A method as in claim 10 wherein determining injection timing for the first fuel is performed by a microprocessor utilizing a calculation based on duration of pulse time for the first fuel and energy characteristics of the second fuel and pressure of the second fuel.

15. A method of providing, in an internal combustion engine operating on one of a first fuel and a second fuel, an injection-pulse time for the second fuel comprising steps of: (a) determining maximum first-fuel-injection-pulse time for the first fuel, (b) determining maximum second-fuel-injection-pulse time for the second fuel, (c) determining difference between the maximum first fuel injection pulse time and the maximum second fuel injection pulse time, (d) starting the first fuel injection pulse, (e) starting the second fuel injection pulse after the first fuel injection pulse following a period of time at least equal to the difference between the maximum first fuel injection pulse time and the maximum second fuel injection pulse time, (f) determining the first fuel injection pulse time after the first fuel injection pulse ends, and (g) calculating the second fuel injection pulse time using the first fuel injection pulse time, and (h) ending the second fuel injection pulse after the second fuel injection pulse time ends.

16. A method as in claim 15 wherein the first fuel is petrol and the second fuel is liquid petroleum gas.

17. A method as in claim 15 wherein calculation of the second fuel injection pulse time is performed by a microprocessor utilizing a look-up table.

18. A method as in claim 15 wherein calculating the second fuel injection pulse time is performed by a microprocessor utilizing a formula.

* * * * *